H. G. CAVE.
AUTOMOBILE TIRE.
APPLICATION FILED APR. 22, 1919.

1,325,141.

Patented Dec. 16, 1919.
2 SHEETS—SHEET 1.

WITNESSES

INVENTOR
HERBERT G. CAVE
BY
ATTORNEYS

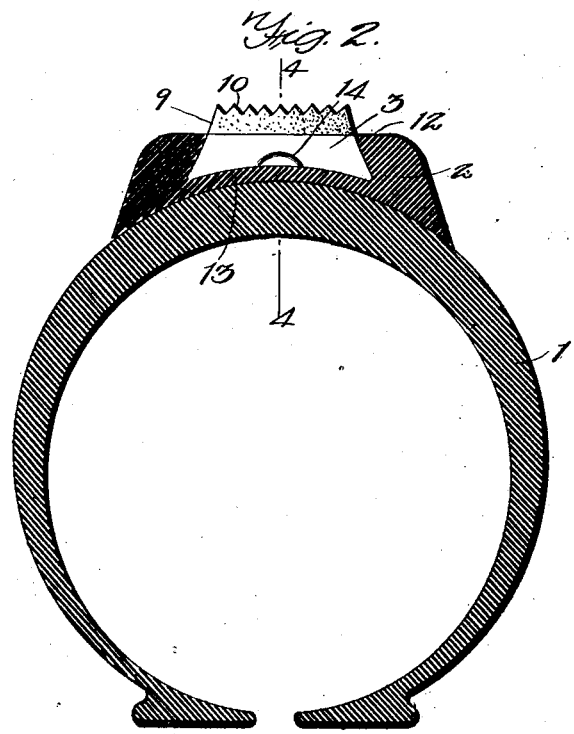
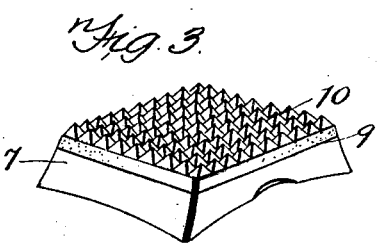
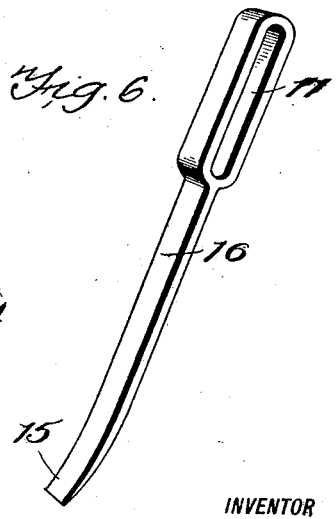
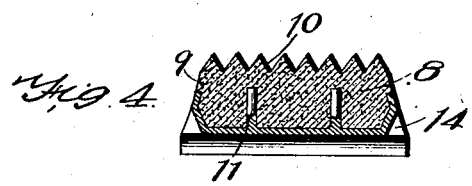
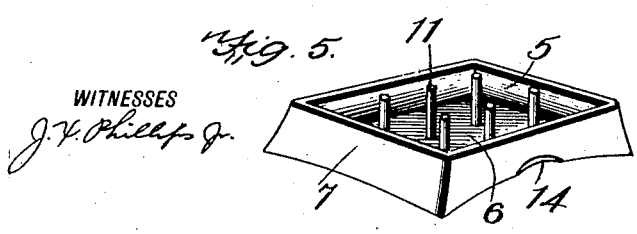

UNITED STATES PATENT OFFICE.

HERBERT GEORGE CAVE, OF NEW YORK, N. Y.

AUTOMOBILE-TIRE.

1,325,141.  Specification of Letters Patent.  Patented Dec. 16, 1919.

Application filed April 22, 1919. Serial No. 291,904.

*To all whom it may concern:*

Be it known that I, HERBERT GEORGE CAVE, a citizen of the United States, and a resident of New York, in the county of New York and State of New York, have invented a new and useful Improvement in Automobile-Tires, of which the following is a specification.

This invention relates to an improvement in automobile tires, and more particularly to that class of tires known as non-skid tires.

One of the principal objects of the invention is to provide an improved tire of this type which can be used to equally good advantage either in dry or wet weather, means being afforded by the invention which will prevent slipping of the tire on roads or streets in wet weather, and which will secure a good purchase against a surface of dusty country roads in dry weather.

The invention involves the use of a plurality of blocks of artificial stone set at spaced intervals in the tread of the tire, the arrangement being such that the blocks may be removed, when worn, for replacement.

A further object of the invention is to provide an improved tire of the class described which will be simple, durable, efficient in operation, and comparatively inexpensive to manufacture.

With these and other objects in view which will become apparent as the description proceeds, the invention resides in the construction, combination and arrangement of parts hereinafter more fully described and claimed and illustrated in the accompanying drawing, in which like characters of reference indicate like parts throughout the several figures, of which—

Fig. 2 represents a transverse sectional view taken through the tire.

Fig. 3 represents a view in perspective of one of the blocks.

Fig. 4 represents a sectional view taken through the block.

Fig. 5 represents a view in perspective of the metallic base used in connection with the block.

Fig. 6 represents a view in perspective of the tool used in removing the block from the tire.

Figure 1:
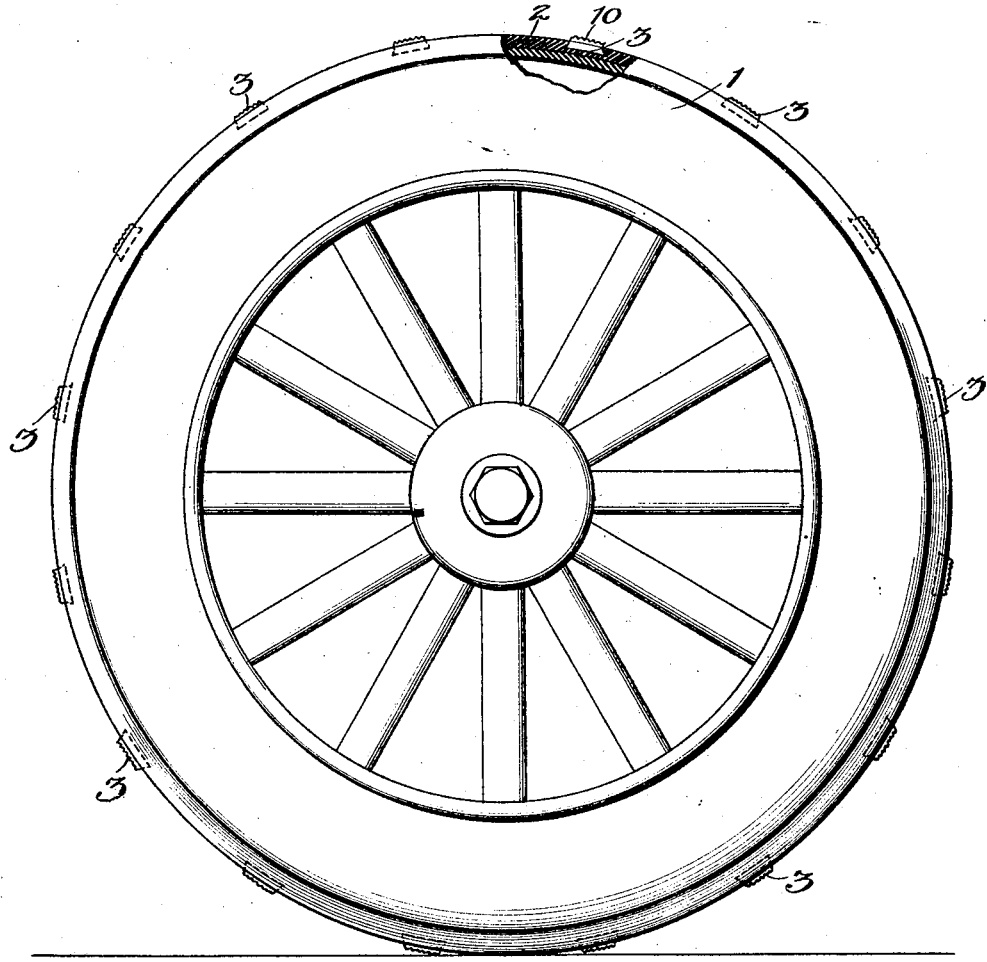
Figure 1 represents a view in elevation, a part being shown in section, of a tire constructed according to my invention.

The invention is applicable either to pneumatic or solid tires, and has been shown as applied to a pneumatic tire simply for purposes of convenience of illustration. Referring more particularly to the drawing, a tire casing is indicated at 1, and the tread of the casing is preferably thickened as at 2. The thickened tread 2 may either be formed integrally with the casing or may be in the nature of a separate tread or shoe vulcanized or otherwise fixed in place on the casing.

At spaced intervals around the tread 2 are arranged a plurality of blocks indicated generally at 3, which blocks form means for gripping the surface of the roadway to prevent slipping or skidding of the tire.

The blocks each include a hollow metallic base 5, comprising a rectangular inner wall 6, and side walls 7. The base is generally pyramidal in cross section, that is, the walls converge outwardly. The inner wall 6 of the base is curved longitudinally and transversely to conform to the curvature of the tire. Within this base is pressed or molded a filling 8 of artificial stone. This filling projects beyond the base as at 9, and has its outer surface roughened or serrated as at 10.

Extending up from the inner wall 6 of the base are a plurality of studs 11, which studs, in conjunction with the fact that the walls converge outwardly, serve the double purpose of holding or strengthening the artificial stone against breaking or cracking and preventing its loss from the base.

Each of the blocks is embedded in the tread 2, to such a depth that the outer edges of the walls 7 are flush with the surface 12 of the tread, as indicated clearly in Fig. 2. The exposed surfaces of the artificial stones thus project slightly beyond the surface of the tread, and in so doing affords a sure means of gripping the roadway. The tread 2 is preferably made of such thickness that a pad, indicated at 13, of suitable depth, occurs between the base of the blocks and the surface of the casing proper, so that there will be no danger of the block cutting or lacerating the casing itself. It will be noted that the shape of the metallic base, while preventing displacement or loss of the artificial stone filler, also prevents accidental displacement or removal of the block itself from the tread of the tire.

On opposed sides the walls of the metallic base at the inner face of the base are formed with recesses 14 adapted to be engaged by the lower tapered end 15 of a tool, as illustrated in Fig. 6, which tool is used in prying blocks out of the tread 2, when the blocks are to be replaced by new ones. This tool includes a shank 16, having a handle portion 17 in its upper end, and having a tapered and curved lower end, as indicated at 15. In removing the block the tapered end of the tool is inserted between the tread and the wall of the base, and the tool is then pushed down until its end engages in the release 14. An upward pull coincident with a prying movement of the tool will effect a dislodgment of the block from its position in the tread of the tire.

The projecting portion of the artificial stone may wear away in time, until it is worn flush with the upper edges of the walls of the base. During this wearing process of the serrated surface the teeth may, as desired, be reëstablished from time to time by the use of a file of suitable type.

Care must be used to manufacture the blocks to attain the proper consistency of artificial stones for use in connection with automobiles of various weights, as too hard a stone used on a light car might not secure as good a result as a stone of softer consistency. On the other hand, a stone of comparatively hard consistency would be preferable used on a tire in connection with a heavy automobile.

Figure 7:
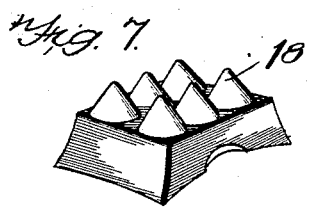
Fig. 7 represents a view in perspective of a metallic block designed to be used under certain conditions.

In Fig. 7, I have illustrated a solid metallic block which may be used to advantage in very icy weather, this block being equipped with a plurality of knobs 18, which are relatively sharp and long for engaging in the ice or sleet covering the roadway, providing a sure grip for the tire.

Although I have described the preferred embodiment of my invention, I may desire to make such changes in the construction, combination, and arrangement of parts thereof as do not depart from the spirit of the invention and scope of the appended claims.

I claim—

1. In a tire, the combination with the resilient tread thereof, of a rigid block embedded in the tread and having a recess adapted to be engaged by a tool for effecting removal of the block.

2. In a tire of the class described the combination with a resilient tread of a metallic block embedded in the tread and having a recess formed in one of its base edges, whereby a tool may be engaged with the block for removing it from the tread.

3. In a tire of the class described, the combination with a resilient tread of a pyramidal block embedded in the tread and having a recess adapted to be engaged by a tool for removing the block from the tread.

HERBERT GEORGE CAVE.

Witnesses:
LAURENCE GARDNER,
HERBERT FOSTER.